United States Patent [19]
Matsumoto

[11] Patent Number: 5,467,270
[45] Date of Patent: Nov. 14, 1995

[54] SYSTEM AND METHOD FOR POS BASED FUZZY THEORY UTILIZING DATA EXTRACTION

[75] Inventor: Hiroshi Matsumoto, Tokyo, Japan

[73] Assignee: NEC Corporation, Tokyo, Japan

[21] Appl. No.: 827,038

[22] Filed: Jan. 29, 1992

[30] Foreign Application Priority Data

Jan. 29, 1991 [JP] Japan ................ 3-026690

[51] Int. Cl.⁶ .................................... G06F 19/00
[52] U.S. Cl. .................................... 364/403
[58] Field of Search .............. 364/401, 403, 364/419.2; 395/900, 925, 61

[56] References Cited

U.S. PATENT DOCUMENTS

| | | | |
|---|---|---|---|
| 3,978,324 | 8/1976 | Rayner | 364/403 |
| 4,270,182 | 5/1981 | Asija | 364/419.2 |
| 4,509,123 | 4/1985 | Vereen | 364/403 |
| 4,688,178 | 8/1987 | Connelly et al. | 364/403 |
| 4,722,054 | 1/1988 | Yorozu et al. | 364/401 |
| 4,745,555 | 5/1988 | Connelly et al. | 364/403 |
| 4,930,077 | 5/1990 | Fan | 364/419.2 |
| 4,964,043 | 10/1990 | Galvin | 364/401 |
| 4,972,504 | 11/1990 | Daniel, Jr. et al. | 364/403 |
| 5,038,283 | 8/1991 | Caveney | 364/401 |
| 5,072,385 | 12/1991 | Rebeillard et al. | 364/419.2 |
| 5,084,819 | 1/1992 | Dewey et al. | 364/419.2 |
| 5,117,353 | 5/1992 | Stipanovich et al. | 364/401 |
| 5,200,909 | 4/1993 | Juergens | 364/401 |
| 5,202,825 | 4/1993 | Miller et al. | 364/401 |

*Primary Examiner*—Gail O. Hayes
*Assistant Examiner*—J. L. Hazard
*Attorney, Agent, or Firm*—Foley & Lardner

[57] ABSTRACT

In order to facilitate a customer's non-specific enquiry relating to sales records accumulated by a POS system, the sales records are utilized to form a plurality of data tables in response to the customer's non-specific enquiry. The data tables thus obtained are multiplied to produce at least one fuzzy membership function. The function is used to isolate data in an inventory data base pertinent to the non-specific enquiry.

6 Claims, 3 Drawing Sheets

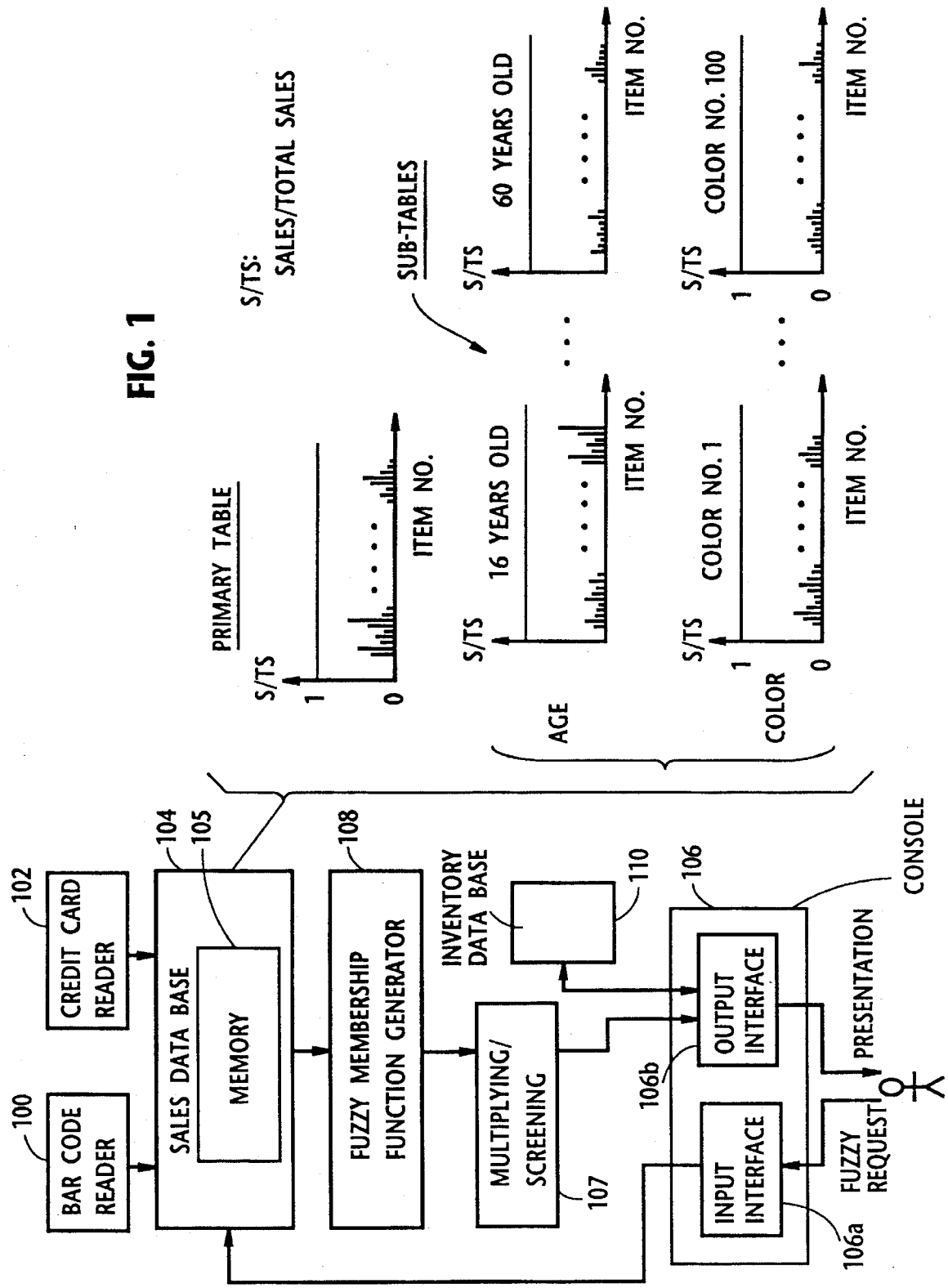

SYSTEM AND METHOD FOR POS BASED FUZZY THEORY UTILIZING DATA EXTRACTION

BACKGROUND OF THE INVENTION

1. Field of the Invention

The present invention relates generally to a system and method for POS (Point of Sales) based data extraction and, more specifically, to a system and method which use fuzzy theory to enable accumulated sales data to be used for client consultations.

2. Description of the Prior Art

POS systems are known for their use in stores wherein a clerk can either pass a wand across a bar code or the like, or pass an article bearing a bar code in front of a scanner. The information thus obtained through a POS terminal is utilized to update inventory and sales records, but to date has not been use for customer consultations.

While these systems are very convenient and are becoming very widely used, a problem has been encountered in that when a customer has a non-specific query concerning some article or merchandise, it has been hitherto impossible to quickly and easily make use of a huge amount of sales data or records for consultation purposes.

SUMMARY OF THE INVENTION

In view of the above drawback it is an object of the present invention to provide a system which enables a POS type data base or the like to be utilized in a manner wherein a general enquiry as to a given item, product or service, can be analyzed using fuzzy techniques, and the required information promptly made available for further consideration.

In brief, the above object is achieved by an arrangement wherein data records acquired through the POS system are selected, tabled and multiplied to produce one or more fuzzy membership function. The function is used to isolate data in another data base pertinent to the enquiry.

More specifically a first aspect of the present invention is a data extraction system comprising: data reader means; data base means which stores and sorts the data from said data reader means, said data base means responsive to an enquiry concerning the data stored therein to derive a plurality of first data tables; first means receiving the plurality of first data tables and generating a plurality of fuzzy membership functions by multiplying the first data tables; second means multiplying the plurality of fuzzy membership functions to generate a second data table, said second means screening data pertaining to said enquiry using said second data table to determine an identity information; and third means for identifying specific items pertinent to the enquiry using said identity information in an inventory data base.

A further aspect of the present invention comes in a POS based fuzzy theory utilizing a data extraction system, comprising: bar code reader means; customer's card reader means; sales data base means which includes a memory and stores data inputs from said bar code reader means and said customer's card reader means in said memory, said sales data base means responsive to an enquiry pertaining to the data stored therein to generate a plurality of tabled data; first means for multiplying the plurality of tabled data to produce a plurality of fuzzy membership functions; second means for deriving a multiplicand of the plurality of fuzzy membership functions and comparing said multiplicand with a predetermined standard to determine item identification data; an inventory data base for storing the inventory data; and third means for identifying one or more items in said inventory data base using said item identification data and generating a signal indicative thereof.

Another aspect of the present invention is a method for data extraction, comprising the steps of: (a) receiving data from data reader means; (b) storing and sorting the data from said data reader means, responding to an enquiry concerning the data stored therein to derive a plurality of first data tables; (c) receiving the plurality of first data tables and generating a plurality of fuzzy membership functions by multiplying the first data tables; (d) multiplying the plurality of fuzzy membership functions to generate a second data table, screening data pertaining to said enquiry using said second data table to determine identity information ; and (e) identifying specific items pertinent to the enquiry using said identity information in an inventory data base.

Still another aspect of the present invention is a method for POS based fuzzy theory utilizing data extraction, comprising the steps of: (a) receiving data from bar code reader means; (b) receiving data from customer's card reader means; (c) receiving and storing the data from said bar code reader means and said customer's card reader means in a memory, responding to an enquiry pertaining to the data stored in the memory to generate a plurality of tabled data; (d) multiplying the plurality of tabled data to produce a plurality of fuzzy membership functions; (e) deriving a multiplicand of the plurality of fuzzy membership functions and comparing said multiplicand with a predetermined standard to determine item identification data; and (f) identifying one or more items in an inventory data base using said item identification data and generating a signal indicative thereof.

BRIEF DESCRIPTION OF THE DRAWINGS

The features and advantages of the present invention will become more clearly appreciated from the following description taken in conjunction with the accompanying drawings in which like portions are denoted by like reference numerals and in which:

FIG. 1 is a diagrammatic representation of a POS based fuzzy theory utilizing a data extraction system according to the present invention.

DETAILED DESCRIPTION OF THE PREFERRED EMBODIMENTS

Figures 2A, 2B:
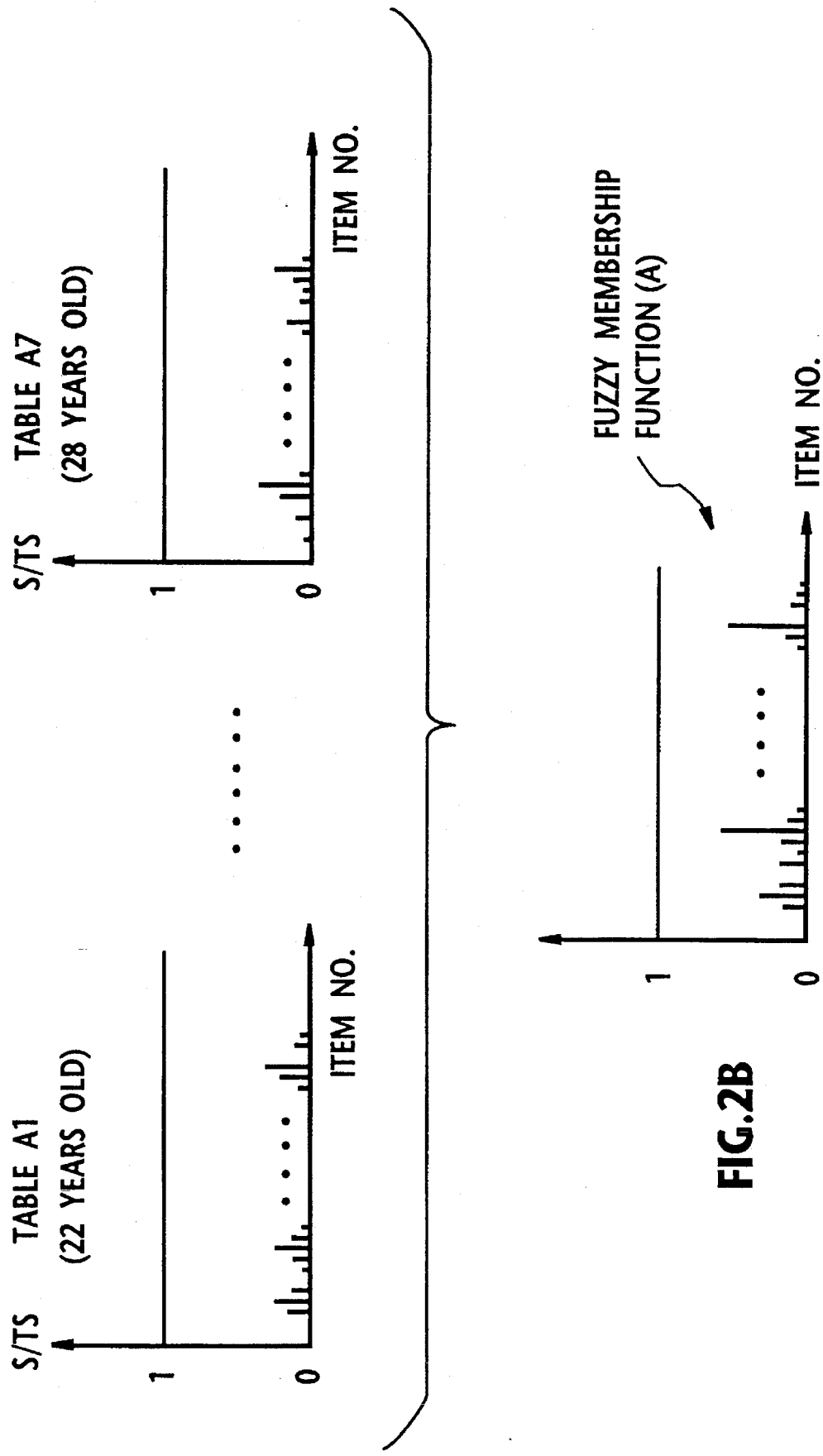
FIGS. 2A–2E graphically depict an example of how data records pertaining to given items, are arranged and used in accordance with the present invention.

FIG. 1 schematically depicts a system according to the present invention. In this system, a bar code reader 100 and a customer card reader 102 are operatively connected with a sales data base 104.

The data from the bar code reader 100 is indicative of the item number of the item which has been sold, while the data from the card reader 102 contains information relating to the customer who has purchased the same. This latter mentioned information would typically include the customer's sex, age and the like.

The sales data base 104 includes a memory 105 which stores the pieces of information applied from the bar code reader 100 and the credit card reader 102 and also memorizes various tables utilized for implementing the instant invention. The memory 105 pre-stores tabled data, by means of which the item numbers from the bar code reader 100 are converted into information relating to the article. For example, item number 16 may be used to indicate a small size red cotton T-shirt with a drawing of a cartoon character on the front, the sales price thereof, etc.

In FIG. 1, units which are not directly concerned with the present invention, such as a unit for supervising the operations of the POS system, are omitted for simplifying the description.

The sales data base 104 is operatively coupled with an input interface 106a, a membership function generator 108, a multiplying/screening section 107, an output interface 106b and an inventory data base 110 in the illustrated manner. As will be appreciated, the input and output interfaces 106a and 106b are included in a single console 106. The output interface 106b may include a display and/or printer.

As illustrated, the sales data which is accumulated in the sales data base 104 is manipulated in a manner which enables the number of sales of each item to be tabled. The memory 105 includes a memory section which pre-stores various information of each of the items which are presented for sale (e.g. items 1–50,000). This item information is subject to updating in a usual manner. In FIG. 1, the ratio of individual sales to total sales (denoted by S/TS) of the whole items is schematically illustrated as a first or primary table.

In addition to this, a large number of other tables for each pertinent variable pertaining to a given item can be prepared and/or maintained upon demand.

Simply by way of example, the sub-tables illustrated in FIG. 1 involve age and color classifications for lady's one-piece dresses. In this instance, the ratio of sales to total sales (S/TS) of the items which do not belong to lady's one-piece dresses, takes the value of zero. That is, the value S for each of the items in the sub-tables which do not correspond to lady's one-piece dresses are given the value of zero, so that information irrelevant to the customer's particular query will not become undesirably involved in determining an appropriate output based on that query. The value TS for each of the items in the sub-tables is the same total sales value as is used in the primary table.

In order to facilitate explanation of the operation of the instant invention, let it be assumed that a young lady who is 25 years old wishes advice on what is currently the most popular red or reddish color one piece dress at the age around 25 years. In response to this rather non-specific query, an input indicative of a one-piece dress, reddish color suitable for a female of 22–28 years of age, is applied to the sales data base 104.

The sales data base 104 responds by reading out and/or generating tables A1–A7 (FIG. 2A) for one piece dresses purchased in the past 3-months (for example) by females for each of the ages 22–28 and tables B1–B11 (FIG. 2C) for color numbers 50–60. In this example it is assumed that color number 50 is indicative of one piece including pinks, 55 of full reds and 60 including oranges.

Figure 2C:
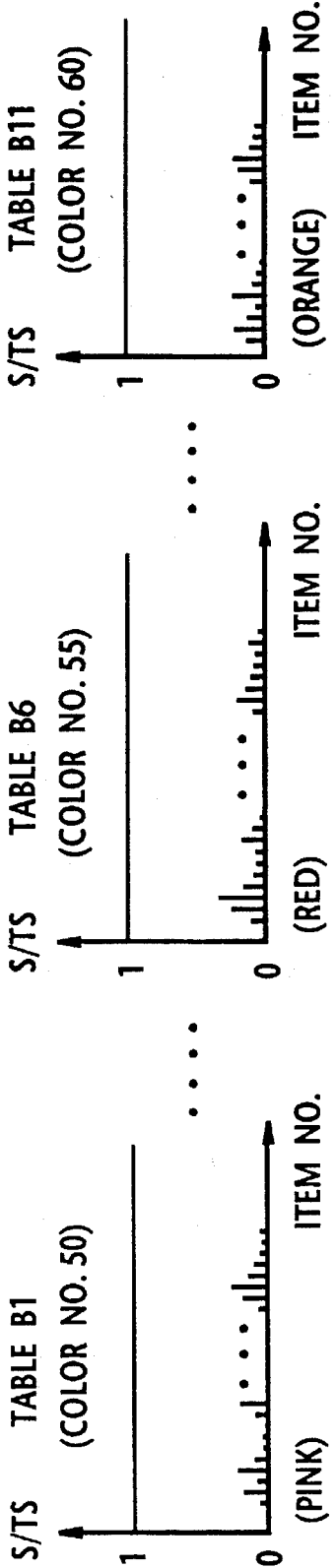

According to the present invention, the above-mentioned tabled data shown in FIGS. 2A and 2C is used to derive a plurality of fuzzy membership functions.

Figure 2D:
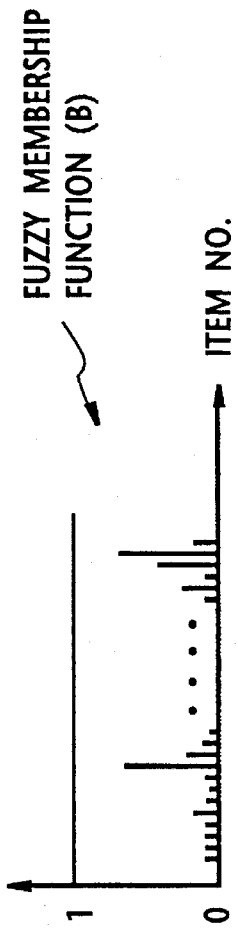

In the example in the instant disclosure, two membership functions are generated. The first membership function (A) as shown in FIG. 2B is derived by multiplying the first group of tables A1–A7 together (Viz., A1×A2×A3 ... ×A7), while the second fuzzy membership function (b) as shown in FIG. 2D is derived by multiplying the second group of tables (B1–B11) together (Viz., B1×B2×B3 ... ×B11).

As will be appreciated, by using the ratio of individual/ total sales (S/TS), upon the tabled data (e.g. A1–A7) being multiplied together, the ratio of each of the whole items (e.g. 50,000) will be less than one and therefore result in the derived value being diminished by the process. If one or more low ratios are multiplied together the result, of course, reduces dramatically. It will be noted that in order to reduce the processing load, it is within the scope of the invention to arbitrarily increase the result of the multiplications by 10, 100 fold or the like in order to reduce the number of digits which follow the decimal point. Viz., in the case a large number of values are multiplied together, the result is apt to become an extremely small value and include a large number of zeros after the decimal point.

Figure 2E:
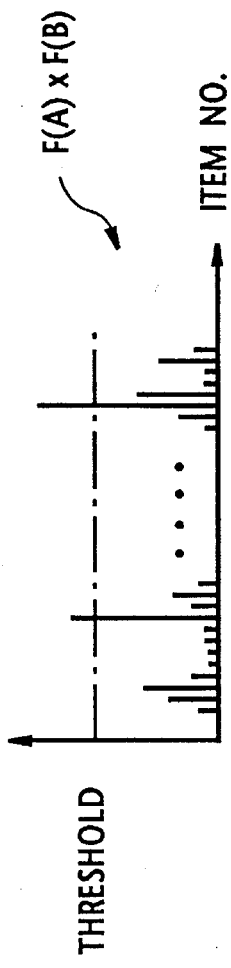

Following the above derivations, the two fuzzy membership functions (A) and (B) are multiplied together at the multiplying/screening unit 107. The result (the multiplicand) is compared, at the unit 107, with a given threshold or slice level in the manner shown in FIG. 2E. As can be seen from FIG. 2E, multiplying of the sub-tables leads to a good separation between the multiplicand values for each of the items and, therefore, as is shown in FIG. 2E, a threshold slice level can be selected to obtain a reasonable number of items to be shown to the customer (i.e., two items exceed the threshold slice level in FIG. 2E). The items which have values greater than the threshold level are identified by item number and this data is then used in the inventory data base 110 to determine the particulars of the items in question. The threshold level can be varied so as to ensure that a reasonable number of items can be identified. Methods via which the threshold level can be varied will be obvious to those skilled in the art to which the present invention pertains.

It will be understood that the above disclosure is representative of only one of many possible applications of the present invention, and that the concept on which the invention is based can be applied to a variety of arrangements/ applications. Further, even though the use of a plurality of membership functions has been mentioned, it is to be understood that the use of a single membership is not excluded from the scope of the invention.

What is claimed is:

1. A data extraction system comprising:

data reader means;

data base means for sorting and storing data from said data reader means, said data base means storing an inventory data base correlating item numbers with characteristics of said item and responsive to an inquiry to generate a plurality of first data tables, said plurality of first data tables being divided into groups;

receiving means for receiving the plurality of said first data tables and for generating a plurality of fuzzy membership functions by multiplying together the first data tables in each said group;

multiplying means for multiplying the plurality of fuzzy membership functions to generate a second data table, said multiplying means screening data pertaining to said inquiry by comparing said second data table with a threshold level to determine identity information pertinent to said inquiry; and identifying means for identifying specific items, using said pertinent identity information in said inventory data base of items.

2. A data extraction system as claimed in claim 1, wherein said data reader includes at least one of a bar code reader and a customer card reader.

3. A data extraction system comprising:

a bar code reader;

a customer card reader;

sales data base means which includes a memory for storing data inputs from said bar code reader and said customer card reader, said sales data base means storing an inventory data base correlating item numbers with characteristics of said item numbers and being responsive to an inquiry to generate a plurality of data tables;

multiplying means for dividing said data tables into groups and multiplying together the data tables in each of selected groups to produce a plurality of fuzzy membership functions;

deriving means for generating a multiplicand of the plurality of fuzzy membership functions and comparing said multiplicand with a threshold level to determine item identification data;

identifying means for identifying one or more of said item numbers in said inventory data base using said item identification data.

4. A data extraction method, comprising the steps of:

receiving data from a data reader means;

sorting and storing the data from said data reader means;

responding to an inquiry concerning said stored data to obtain a plurality of first data tables;

dividing the plurality of said first data tables into groups, and generating a plurality of fuzzy membership functions by multiplying together the first data tables in each said group;

multiplying together the plurality of said fuzzy membership functions to generate a second data table;

screening data pertaining to said inquiry using said second data table to determine information pertaining to said inquiry; and identifying specific items pertinent to the inquiry using said information in an inventory data base by correlating each item number with the characteristics of said item number.

5. A method as claimed in claim 4, wherein said data reader means includes at least one of a bar code reader and a customer card reader.

6. A data extraction method comprising the steps of:

receiving data from a bar code reader means;

receiving data from a customer's card reader means;

receiving and storing in a memory the data from said bar code reader means and said customer's card reader means to generate a plurality of data tables;

dividing said data tables into groups;

multiplying together the data in each group to produce a plurality of fuzzy membership functions;

deriving a multiplicand of the plurality of said fuzzy membership functions;

comparing said multiplicand with a threshold level to determine item identification data; and identifying one or more items in an inventory data base by correlating each item number with the characteristics of said item and using said item identification data and generating information relating to the point of sale and customers.

* * * * *